United States Patent [19]

Kubát et al.

[11] 4,315,887
[45] Feb. 16, 1982

[54] INJECTION MOULDING OF HIGH MOLECULAR POLYETHYLENE USING ELEVATED MOULD TEMPERATURE

[76] Inventors: Josef Kubát, Solsparksvägen 3, S-171 35 Solna; Hans M. Rigdahl, Klostergången 7, S-413 18 Göthenburg; Jan K. Djurner, Viktoriagatan 8, S-411 25 Göthenburg, all of Sweden

[21] Appl. No.: 199,514
[22] PCT Filed: Oct. 19, 1979
[86] PCT No.: PCT/SE79/00209
§ 371 Date: Jun. 20, 1980
§ 102(e) Date: Jun. 12, 1980
[87] PCT Pub. No.: WO80/00812
PCT Pub. Date: May 1, 1980

[30] Foreign Application Priority Data

Oct. 20, 1978 [SE] Sweden ............................ 7810976

[51] Int. Cl.³ .............................................. B29F 1/08
[52] U.S. Cl. ............................ 264/328.16; 264/328.17
[58] Field of Search ..................... 264/338.16, 328.17

[56] References Cited

U.S. PATENT DOCUMENTS 3,036,340  5/1962  Waddell .................... 264/328.16 X
4,237,089  12/1980  Kubat ............................. 264/328.1

FOREIGN PATENT DOCUMENTS 1273839  5/1972  United Kingdom .

OTHER PUBLICATIONS

Chemical Abstracts 83: 132788m.
Chemical Abstracts 83: 116107h.
Chemical Abstracts 84: 60665g.

Primary Examiner—Thomas P. Pavelko
Attorney, Agent, or Firm—Cushman, Darby & Cushman

[57] ABSTRACT

The invention relates to a process for producing injection moulded articles having highly improved mechanical properties of polyethylene having very high molecular weight and high density with the use of elevated pressure exceeding 250 MPa which process is characterized in that the injection moulding is carried out with the simultaneous use of an elevated mould temperature between 40° and 125° C.

6 Claims, 3 Drawing Figures

INJECTION MOULDING OF HIGH MOLECULAR POLYETHYLENE USING ELEVATED MOULD TEMPERATURE

The present invention relates to a process for preparing injection moulded articles of HD-polyethylene (polyethylene of high density type) having a high molecular weight by injection moulding with injection and holding pressures exceeding 250 MPa with the use of an elevated mould cavity temperature between 40° and 125° C., suitably between 50° and 120° C. The articles prepared by means of the process are characterized by extremely improved mechanical strength properties such as very high values for tensile strength at rupture and modulus of elasticity.

From the Swedish Patent Specification 401,129 it is known that an essential increase of the pressure in the mould cavity in processing of thermoplastics by injection moulding results in a number of property improvements of the injection moulded part while simultaneously certain technical process advantages can be obtained. Said Swedish Patent Specification thus discloses an injection moulding process wherein the pressure in connection with the injection of the melt and the subsequent solidification exceeds 250 MPa. Said pressure range shall be compared with the pressure range of 50 to 150 MPa which is the normal pressure range in injection moulding.

Among the improvements of the properties of the moulded part which are provided with a processing pressure exceeding 250 MPa there is to be noted a general increase of the level as regards the stiffness (modulus of elasticity) and strength parameters such as have been obtained in experiments with polyethylene of varying density and polypropylene. Furthermore, in measurements on both crystalline and amorphous polymers a marked decrease in the mould shrinkage has been observed. In certain cases said change was so large that the mould shrinkage assumed negative values.

An additional property improvement which has been observed in experiments of this type has been a marked decrease of the internal stress level. As is well known internal stresses are a defect of normal injection moulded products; they i.a. can result in warpage, undesirable crazing and cracking, etc. Their reduction, in some cases complete elimination, can be traced back to an increase of the melting and softening point respectively of the plastic with the pressure. Thus, pressures within the above specified range have been shown to increase these critical temperatures so that a practically momentary solidification of the melted plastic material injected in the mould cavity is obtained. This prevents the formation of an internal stress structure which, as is well known, is due to a gradual solidification of the melt and to the forces which the already solidified and the still liquid parts of the detail exert on each other.

As regards the improvement of the property profile of the detail, especially as regards the mechanical parameters, the effects obtained with an increase of the process pressure are dependent on the structure of the plastic used. Thus, the largest changes have been observed for crystalline plastics, especially polyethylene, wherein they could be related to changes in the structure of the crystalline phase. In the crystallization of a polyethylene melt under pressure exceeding about 300 MPa a crystal modification is obtained wherein the folded lamellar structure present at normal pressures to an extent increasing with the pressure is converted to a structure consisting of straight chains. The presence of this new structure explains the improved property profile. Thus, the new modification with straight chains i.a. gives a more organized package of the molecules in the space.

Especially striking results are obtained with HD-polyethylene having high molecular weight, which means polyethylene having a molecular weight of from 200.000 up to 1.5 millions and higher (or corresponding to a melt index of less than 1 g/10 minutes at 190° C./2 kg load) hereinafter designated HMWHDPE. As compared to the improvement of modulus and strength obtained with this and similar qualities the corresponding values obtained with HDPE of normal molecular weight were relatively small. As an illustration of the extremely remarkable increase of the property level with an increase of the pressure reference is made to the values stated in the following table I.

TABLE I

|  | E GPa | $\delta_\beta$ MPa |
|---|---|---|
| HMWHDPE | 3,4 | 130 |
| HDPE | 0,6 | 25 |
| Process conditions: | Injection presssure | 500 MPa |
|  | Mould temperature | 30° C. |

E = modulus of elasticity
$\delta_\beta$ = tensile strength at rupture

According to the present invention it has been found that an additional surprising improvement of the properties of details of HMWHDPE injection moulded at pressures exceeding 250 MPa, preferably from 300 MPa and upwards can be obtained by means of a suitable selection of the mould temperature. Thus, according to the present invention it has been found that very manifest improvements of the properties of the detail are obtained if the mould temperature is increased to e.g. 100° C., which increase especially gives rise to an increase of the modulus and the tensile strength. Thus, it has been found that the increased pressure per se is not sufficient for producing details with optimum mechanical properties; an optimum property profile in this respect rather is obtained by a simultaneous increase of both the pressure in the mould cavity and the mould temperature.

Without wishing to restrict the invention to a certain theory a probable explanation to the results obtained seems to reside in a more complete transformation of the crystalline phase to the extended chain modification. This transformation takes place via a crystalline transition (hexagonal→orthorhombic) which is facilitated when the temperature increases.

In the drawings enclosed

It has also been found, as is described in more detail in our copending Swedish Patent Application No. 7810977-4 with the title "Injection moulding process with the use of polymer blends containing high molecular HD-polyethylene" that in injection moulding at high injection moulding pressures exceeding 250 MPa, preferably from 300 MPa and upwards, of blends of HMWHDPE with polymeric materials with which HMWHDPE has a limited compatibility (solubility) HMWHDPE forms a fibrous phase in a matrix of the other polymeric material. In this manner a reinforced composite material is obtained as a final product. By increasing the mould temperature beyond the mould temperature normally used as in accordance with a process according to the present invention it also has been found that composite materials with still more improved mechanical properties can be obtained as compared to the same composite materials injection moulded at the usual low mould temperature of 30° C. Suitable matrix materials together with which HMWHDPE can be injection moulded in the process according to the present invention are such polymeric materials with which HMWHDPE has limited compatability. Such polymeric materials include polyethylene of HD-, MD- and LD-types of normal molecular weight which means such material which normally is used in injection moulding or extrusion. Other suitable materials are e.g. polyolefines, such as polypropylene; polystyrene, polyvinylchloride, polyacetal, polyamides, copolymers of these and others.

The invention is illustrated by means of the following specific examples which describe embodiments of the invention but which are not intended to limit the invention in any respect.

EXAMPLE 1

Test bars of high molecular polyethylene having high density were injection moulded with an injection pressure of 500 MPa and with the use of varying mould temperatures from 30° C. up to 100° C. The polyethylene material used was DMDS2215 obtained from Unifos Kemi AB and which had a density of 0.953 g/cm$^3$ and a melt index of 0.1 g/10 minutes.

Figure 1:
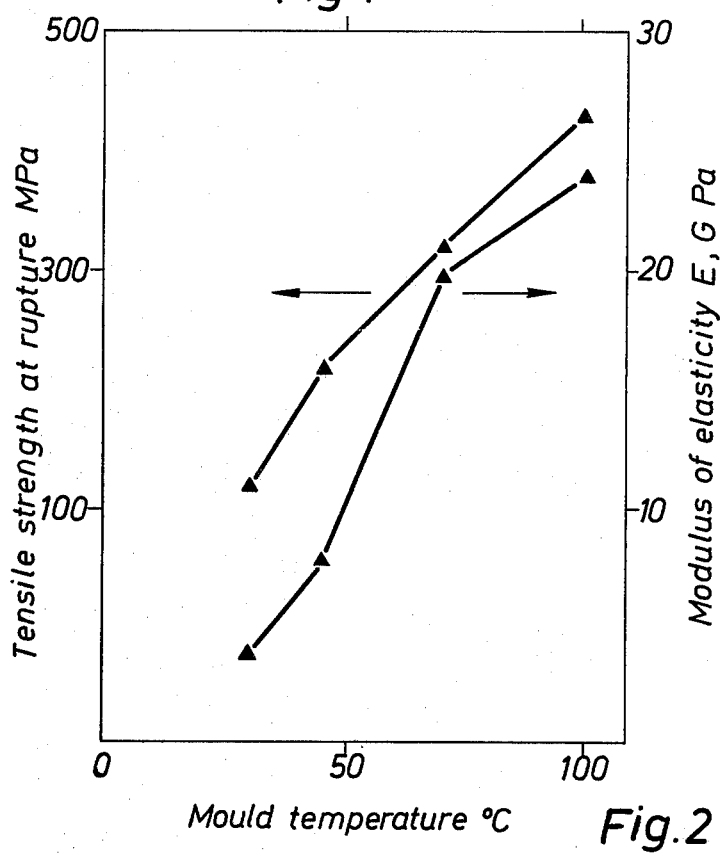
FIG. 1 shows tensile strength at rupture and modulus of elasticity of injected moulded articles of HMWHDPE plotted against the mould temperature.

In FIG. 1 the values obtained for tensile strength at rupture, $\sigma$, and modulus of elasticity, E, of the test bars produced have been plotted against the mould temperature. From the figure it can be seen that improved values for said properties are obtained when the mould cavity temperature is increased. From the results obtained it can be seen that the absolute values for modulus of elasticity and tensile strength at rupture are very high and vastly exceed those normally obtained for HDPE and furthermore also exceed the corresponding values of e.g. glass fiber reinforced engineering plastics.

EXAMPLE 2

A set of test bars of the same material as used in Example 1 were injection moulded at injection pressures varying between 100 and 500 MPa and with the use of two different mould cavity temperatures, 30° C. and 70° C. respectively.

Figure 2:
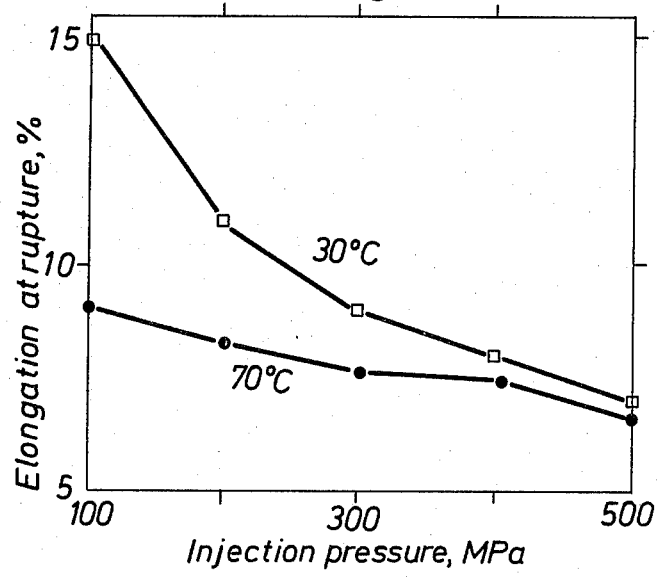
FIG. 2 shows elongation at rupture of injection moulded articles of HMWHDPE plotted against the injection pressure for two different mould temperatures.
Figure 3:
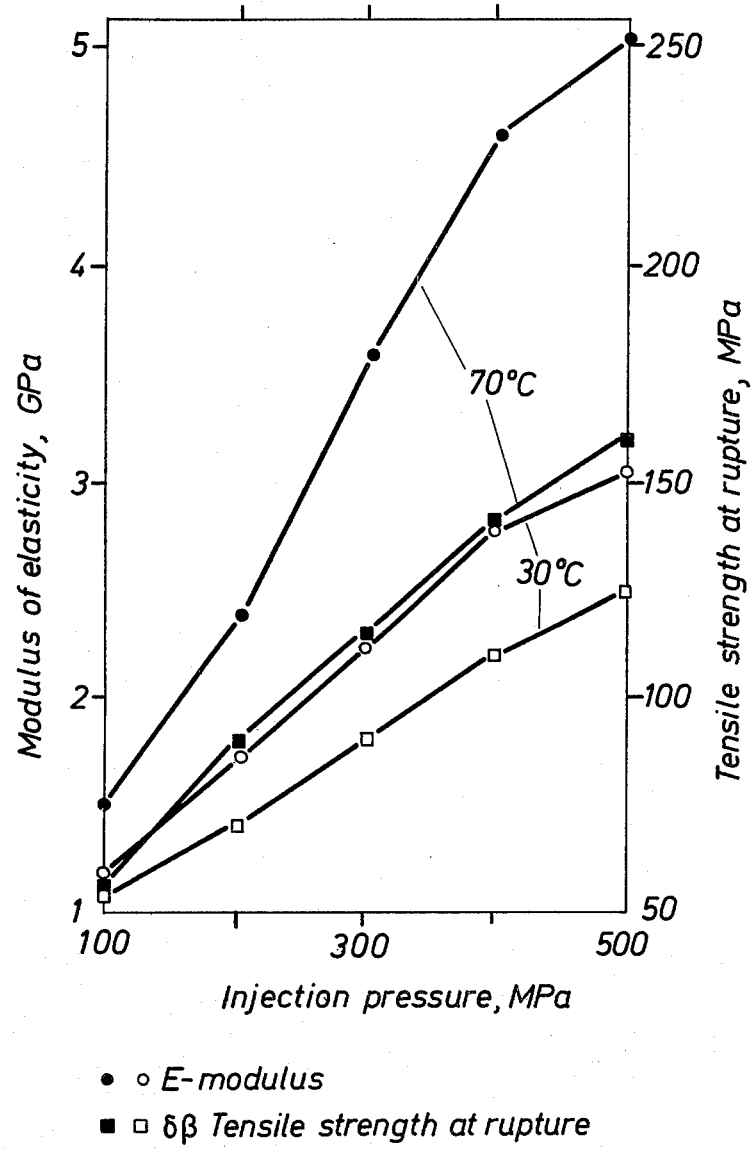
FIG. 3 shows tensile strength at rupture and modulus of elasticity of injection moulded articles of HMWHDPE plotted against the injection pressure for two different mould temperatures.

FIGS. 2 and 3 show the results of measurements concerning the mechanical properties of the products obtained. From FIG. 2 it can be seen that the elongation at rupture is lower when using the higher mould cavity temperature while FIG. 3 shows that both the modulus of elasticity and the tensile strength at rupture increase when the higher mould cavity temperature is used.

We claim:

1. A process for producing a polyethylene article comprising injection molding a high molecular weight high density polyethylene in an injection mold at a pressure of more than 250 MPa in combination with conducting said injection molding at a mold temperature in the range of from 40° to 125° C. thereby producing an injection molded article exhibiting a high tensile strength, a low elongation at rupture and a high modulus of elasticity.

2. The process according to claim 1 wherein said pressure is in the range of about 300 to about 500 MPa.

3. The process according to claim 1 or 2 wherein said mold temperature is in the range of about 50° C. to about 120° C.

4. The process according to claim 3 wherein said high density polyethylene has a molecular weight in the range of 200,000 to 1.5 million.

5. The process according to claim 3 wherein said polyethylene has a density of about 0.953 g/cm$^3$ and a melt index of about 0.1 g/10 minutes at 190° C./2 kg load.

6. The process according to claim 1 or 2 wherein said high molecular weight high density polyethylene is blended with a polymeric material with which said polyethylene has limited compatibility.

* * * * *